United States Patent [19]

Tachikawa et al.

[11] Patent Number: 4,964,719
[45] Date of Patent: Oct. 23, 1990

[54] CONTROL METHOD OF BRIGHTNESS OF SCREEN USED FOR PROJECTION DISPLAY AND CONTROL APPARATUS OF THE SAME

[75] Inventors: Makoto Tachikawa, Hitachi; Osamu Suzuki, Hiratsuka; Tadahiko Hashimoto, Katsuta; Kuniyuki Igari; Ichirou Katsuyama, both of Hitachi, all of Japan

[73] Assignee: Hitachi, Ltd., Tokyo, Japan

[21] Appl. No.: 392,011

[22] Filed: Aug. 10, 1989

[30] Foreign Application Priority Data

Sep. 8, 1988 [JP] Japan ................. 63-225271

[51] Int. Cl.⁵ .............................................. G03B 2/20
[52] U.S. Cl. ................................................... 353/85
[58] Field of Search .................... 353/85; 250/205; 355/67, 69; 352/198

[56] References Cited

U.S. PATENT DOCUMENTS

| | | | |
|---|---|---|---|
| 3,833,297 | 9/1974 | Swartz | 353/85 |
| 4,040,047 | 8/1977 | Hareng et al. | |
| 4,299,451 | 11/1981 | Task | 353/85 X |
| 4,825,065 | 4/1989 | Imai | 350/205 |

*Primary Examiner*—Harry N. Haroian
*Attorney, Agent, or Firm*—Fay, Sharpe, Beall, Fagan, Minnich & McKee

[57] ABSTRACT

Brightness of a screen is detected on the basis of a luminous flux projected from a light source to the screen. This detection signal is fed back and a set value of brightness of the screen is compared with the detection signal. The magnitude of input power to the light source is controlled so that the comparison value becomes zero.

17 Claims, 7 Drawing Sheets

USE TIME OF PROJECTING LIGHT SOURSE (Hr)

USE TIME OF PROJECTING LIGHT SOURSE (Hr)

CONTROL METHOD OF BRIGHTNESS OF SCREEN USED FOR PROJECTION DISPLAY AND CONTROL APPARATUS OF THE SAME

FIELD OF THE INVENTION

This invention relates to a control method of brightness of a screen used for a projection display and a control apparatus of the same.

BACKGROUND OF THE INVENTION

A typical conventional projection display is disclosed, for example, in U.S. Pat. No. 4,040,047 entitled "Erasable Thermo-Optic Storage Display of a Transmitted Image" distributed on Aug. 2, 1977. This apparatus does not control the input power of an illumination light source in response to brightness of the screen. For this reason, screen brightness might drop due to the change with time of the illumination light source or a projection light source.

The prior art apparatus described above is not free from a drawbacks in that since brightness of the light source fluctuates due to the change with time of the projection light source and due to the change of ambient conditions, screen brightness is not constant and a stable screen image cannot be obtained. More specifically, brightness of a Xenon lamp (hereunder, Xe lamp), which is this kind, drops with the passage of time and the image becomes somewhat darker and difficult to watch with the passage of a few months after the start of use. Therefore, it has been customary to replace the Xe lamp by new one at this stage by judging that the life of the lamp is reached.

The prior art apparatus is not at all considered at this point but replaced the Xe lamp with a new one within a short period by judging that the service life is over. Therefore, the lamp is not utilized fully and a stable screen image in brightness cannot be obtained.

SUMMARY OF THE INVENTION

An object of the present invention is to provide a control method of brightness of a screen used for a projection display and control apparatus of the same which can use a light source for a long period and can provide a stable screen image in conjunction with brightness.

To accomplish the object described above, the present invention provides a control method of brightness of a screen used for a projection display which comprises detecting brightness of a screen based on the luminous flux projected on the screen from a light source, feeding back its detection signal, comparing a set value of brightness of the screen with the actually measured value detected, and regulating the input power to be supplied to the light source in such a direction that the difference between them becomes zero.

The present invention provides also a control method of brightness of a screen used for a projection display which comprises setting in advance the relationship between the magnitude of the input power to be supplied to the light source, its supply time and brightness of the light source to such a relationship that brightness becomes substantially constant, measuring actually the supply time of the input power to the light source and regulating the input power so that brightness becomes substantially constant on the basis of the relationship set in advance.

Furthermore, the present invention provides a control apparatus of brightness of a screen used for a projection display which comprises a light source, a screen on which a luminous flux emitted from the light source is modulated and displayed as a screen image brightness detection means for detecting brightness of this screen and input power control means to which the actually measured value detected by the brightness detection means is fed back, which compares it with a set value of screen brightness set in advance and which regulates the magnitude of the input power to be supplied to the light source in such a direction that the difference between them becomes zero.

The present invention provides also a control apparatus of brightness of a screen used for a projection display which comprises a light source, a screen on which a luminous flux emitted from the light source is modulated and displayed as a screen image, time measurement means for measuring actually the supply time of an input power to the light source, and input power control means to which the relationship between the magnitude of the input power to be supplied to the light source, its supply time and brightness of the light source is set so that brightness of the light source becomes substantially constant, which receives the signal from the time measurement means and which regulates the magnitude of the input power so that brightness of the light source becomes substantially constant, on the basis of the relationship set in advance.

In the control apparatus described above, the input power control means is preferably the one that changes and regulates an input current to the light source.

In the control apparatus described above, the input power control means includes, for example, a change-over switch for connecting individually the input side of the light source to a plurality of terminals for mutually different impressed voltage and a switch for switching the change-over switch upon receiving the signal from the time measurement means.

In the control apparatus described above, the input power control means includes, for example, a function generator which is connected to the time measurement means and to which the inverse function of the correlation of the supply time of the input power to the light source and brightness of the light source is set, and a multiplier which is disposed between the light source and a power source and outputs a signal regulating the magnitude of the input power upon receiving the signal from the function generator.

In the control apparatus described above, the input power control means includes, for example, a function generator which is connected to the time measurement means and to which the inverse function of the correlation of the supply time of the input power to the light source and brightness of the light source is set, and an amplifier which receives the signal from the function generator and regulates a power source voltage.

In the control apparatus described above, the time measurement means includes the one that detects the voltage applied to the power source and measures its supply time, or the one that measures an A.C. input of a D.C. amplifier for the light source.

In the control apparatus described above, it is advisable to dispose an alarm which operates at a time after the passage of a predetermined time from the point of time at which the magnitude of the input power to the light source attains a set maximum value.

In the control apparatus described above, a brightness sensor or an illumination sensor can be utilized as the brightness detection means.

In the control apparatus described above, examples of the light source include a Xe lamp, an Ar lamp, a mercury lamp and a halogen lamp.

The control apparatus described above preferably includes means for comparing the magnitude of the input power regulated by the input power control means with the magnitude of the actual input power supplied to the light source and for regulating the magnitude of the input power.

In accordance with the present invention, brightness of the screen is detected and fed back by the brightness detection means so that the input power control means operates in such a direction as to increase brightness of the light source. Accordingly, the drop of brightness of the light source with the passage of time is prevented by increasing the input power and brightness of the screen can be kept substantially constant.

Brightness of the light source drops with the passage of time while keeping the correlation with the magnitude of the input power to the light source and the time of use. Therefore, if such a correlation is in advance determined for the light source, the use time of the light source can be measured by the time measurement means without detecting brightness of the screen in practice, the magnitude of the input power can be regulated on the basis of the correlation determined in advance and brightness of the light source can be made substantially constant.

DETAILED DESCRIPTION OF THE PREFERRED EMBODIMENTS

Figure 1:
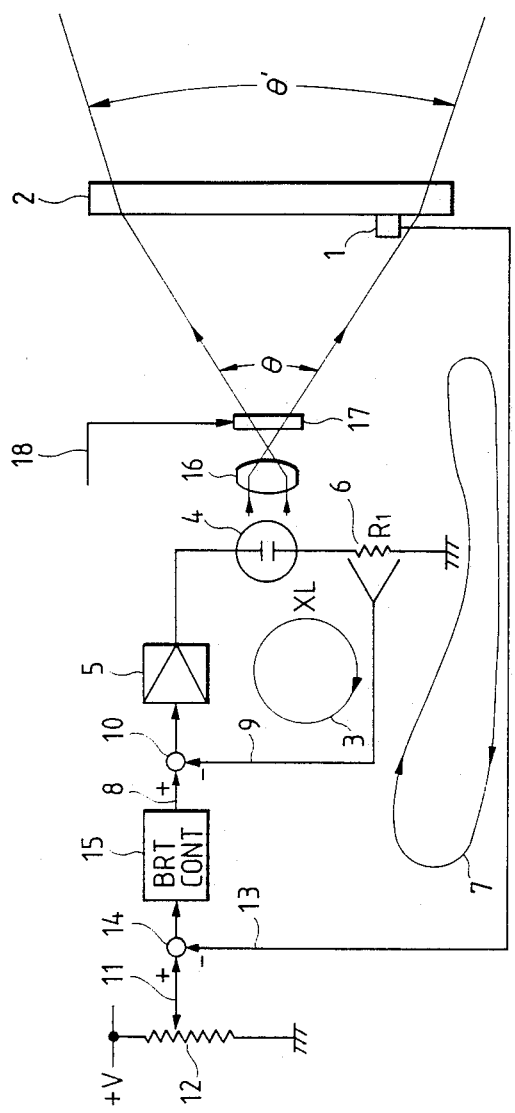
FIG. 1 is a structural view showing a control apparatus in accordance with one embodiment of the present invention.

FIG. 1 shows a system which detects brightness of a screen and controls brightness of the screen of a projection display. Incidentally, the system of FIG. 1 may be of the type which detects illumination of the screen by use of an illumination detector. Though the brightness detector 1 is shown disposed near the screen 2 in the drawing, it may be disposed within the reach range of angles $\theta$, $\theta'$ of luminous fluxes. The operation and construction of the system will be hereinafter explained. The innermost loop 3 is a current control loop. This current control loop 3 consists of a projection light source 4, a D.C. amplifier 5 for a light source and a current detection resistor 6 ($R_I$). The current feedback control of this loop 3 is such that a current instruction 8 given from a brightness control loop 7 and a current feedback value 9 are processed by an adder 10 so that a light source current corresponding to the current instruction 8 flows. Incidentally, examples of the light source include a Xe lamp, an Ar lamp, a mercury lamp and a halogen lamp.

To control the light source current is substantially equal to the control of the input power to the light source 4. For, as the property peculiar to a discharge tube, the terminal voltage of the projection light source 4 is constant irrelevantly to a passing current. In other words, the following equation is given:

$$PT = Vt \cdot It = K \cdot It \qquad (1)$$

where:
  Pt: input power,
  Vt: terminal voltage,
  It: passing current,
  K: constant.

Accordingly, output brightness of the projection light source 4 can be controlled by controlling the input current. The brightness instruction 11 is generated by a potentiometer 12 or a brightness instruction variable resistor. This brightness instruction 11 and the output 13 of the brightness detector 1 on the screen 2, that is, screen brightness, are processed by the adder 14 and the processed result is applied to the brightness controller 15 to output the current instruction 8 described above.

If screen brightness or the brightness detection value drops, the brightness controller 15 increases the current instruction 8 to thereby increase the input current to the light source 4. This increase in the current results in the increase in the input power to the light source 4 and therefore operates so as to increase brightness of the light source 4. In accordance with the operation described above, brightness constant control can be made on the basis of the brightness instruction 11. The predetermined luminous flux from the projection light source 4 which has predetermined brightness passes through a projection lens 16 and an optical screen modulator 17 and strikes the screen 2 so that the picture corresponding to a modulation signal 18 is displayed on the screen 2.

Figure 2:
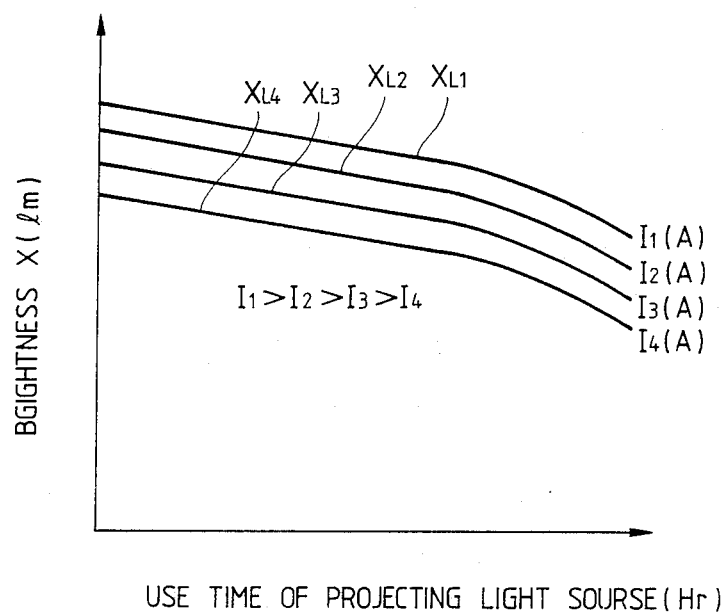
FIG. 2 is a characteristic diagram showing the relation between brightness of a light source and a use time.

The drop of brightness of the light source 4 will be explained with reference to FIG. 2. This diagram shows the characteristics of the projection light source 4. Brightness of the projection light source drops with the passage of its use time. Symbols $I_1$, $I_2$, $I_3$ and $I_4$ represent the magnitudes of the input current to the light source and symbols $X_{L1}$, $X_{L2}$, $X_{L3}$ and $X_{L4}$ represent brightness corresponding to the input currents $I_1$, $I_2$, $I_3$ and $I_4$, respectively. Generally, brightness of a discharge tube drops as described above and its cause resides in that scattering materials of an electrode occurring with discharge adhere to the inside of the discharge tube and impede the passage of the rays of light. For this reason, brightness drops monotonously.

When brightness of the light source 4 drops, brightness of the screen 2 drops, too. This drop is detected by the brightness detector 1 and the input current to the light source 4, that is, the input power, is increased to prevent the drop of brightness of the light source 4 so as to keep brightness of the screen 2 substantially constant. This is attained by the embodiment shown in FIG. 1.

Figure 3:
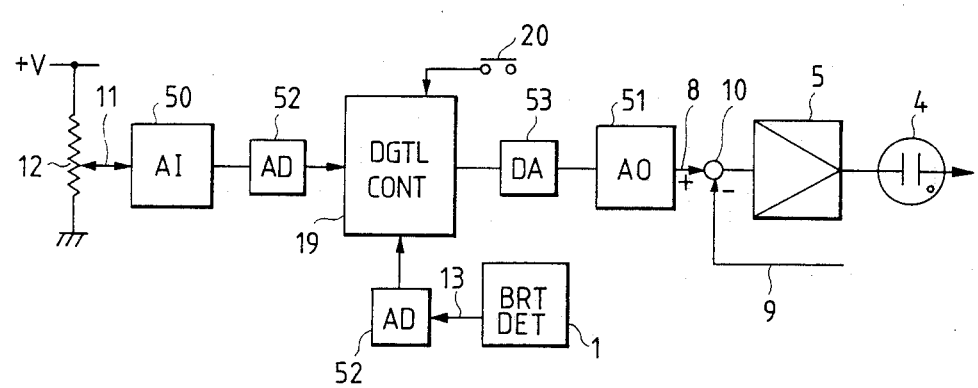
FIG. 3 is a structural view of the principal portions when control is effected in the same way as in the embodiment shown in FIG. 1 by use of a micro-computer.
Figure 4:
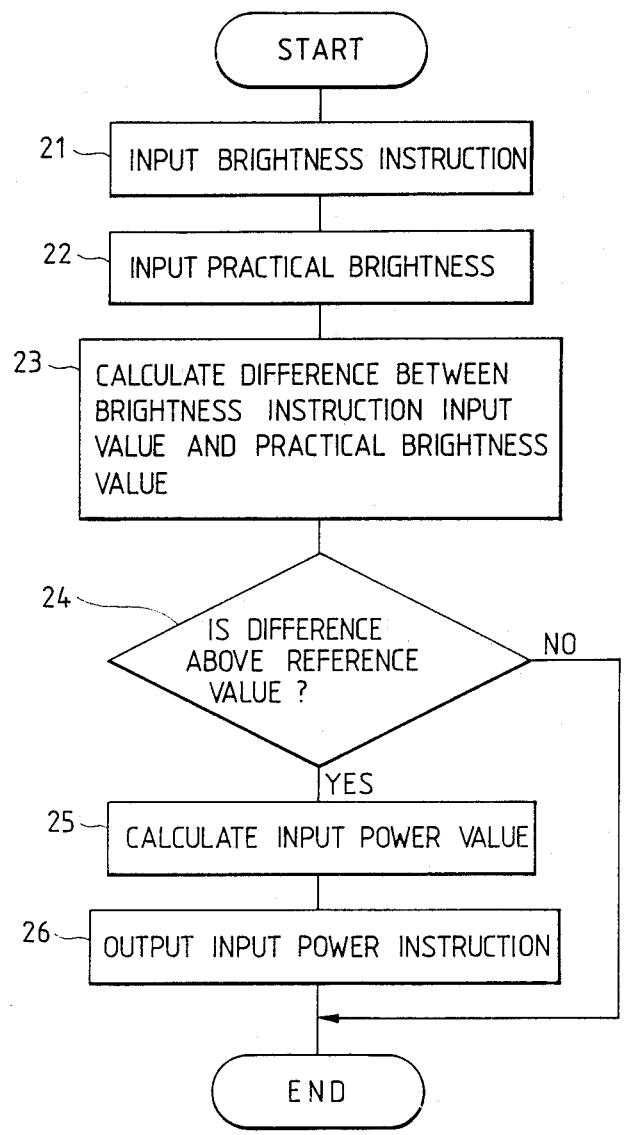
FIG. 4 is a flowchart when brightness of the screen of a projection display is controlled by use of the apparatus shown in FIG. 3.

FIG. 3 is a structural view showing the principal portions of an apparatus performing substantially the same control as that of the embodiment shown in FIG. 1 by use of a micro-computer. In the drawing, reference numeral 19 represents a digital controller equipped with a micro-computer (MPU) and memories (ME); 50 is an analog input AI; 51 is an analog output AO; 52 is an analog/digital converter (AD); 53 is a digital/analog converter (DA); and 20 is a data input portion. The processing of this digital controller 19 is shown in the flowchart of FIG. 4.

The brightness instruction 11 is inputted to the digital controller 19 through AI and AD at step 21. The brightness detection output 13 from the brightness detector 1, that is, practical brightness of the screen, is inputted at step 22. The difference between the brightness instruction input value and the practical brightness value is calculated at step 23. Whether or not this difference is above a predetermined reference value is judged at step 24. This reference value is set so that screen brightness falls within an allowable range. If the difference described above is above the reference value, brightness of the light source must be increased. Therefore, the value of a new current instruction 8, that is, a new input power value, is calculated at step 25. This calculation can be conducted on the basis of the characteristics shown in FIG. 2. The input power instruction thus determined is output at step 26 to the adder 10 through DA and AO. If the difference is below the reference value, on the other hand, the input power need not be changed.

Figure 5:
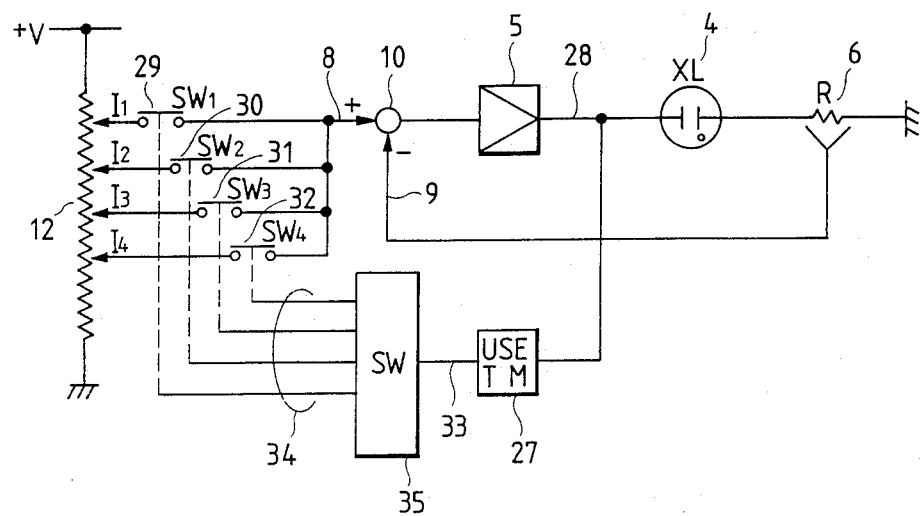
FIG. 5 is a structural view showing another embodiment of the present invention.
Figure 6:
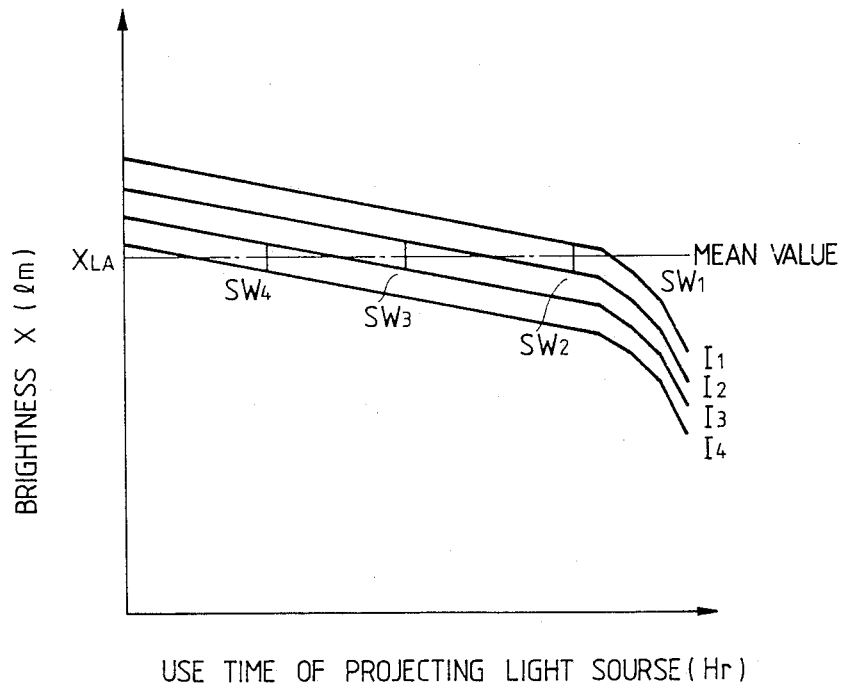
FIG. 6 is an explanatory view useful for explaining the change-over operation of a switch shown in FIG. 5.

FIG. 5 shows a control system for measuring actually the supply time of the input power to the light source. A use time meter 27 for measuring this supply time detects the voltage 28 applied to the light source 4 and measures the application time. The input power control apparatus in this embodiment includes change-over switches 29, 30, 31, 32 for individually connecting the input side of the light source 4 to a plurality of terminals having mutually different impressed voltages and a switch 35 for receiving the signal 33 from the use time meter 27 and outputting the signal 34 which changes over the change-over switches 29, 30, 31, 32. As shown in FIG. 6, the change-over operation of the switches is made in such a manner as to increase the current instruction 8 with the use time. Due to this switching operation, brightness of the light source reaches a mean value $X_{LA}$ (1 m) and good screen brightness with less fluctuation can be obtained.

Figure 7:
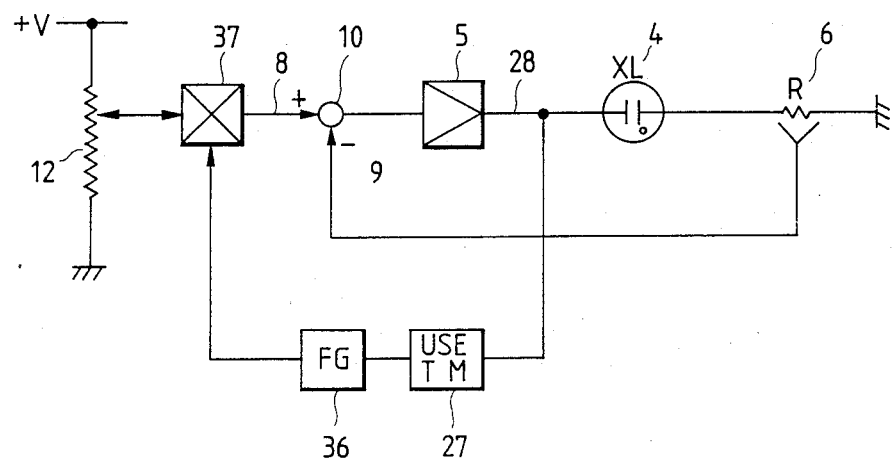
FIG. 7 is a structural view showing still another embodiment of the present invention.

FIG. 7 shows another embodiment of the present invention. The input power control apparatus of this embodiment is equipped with a function generator 36 which is connected to the use time meter 27 and to which the inverse function of the correlation (FIG. 2) between the supply time of the input power to the light source and brightness of the light source 4 is set and with a multiplier 37 which is disposed between the light source 4 and its power source, receives the signal from the function generator 36 and outputs a signal for regulating the magnitude of the input power, that is, the current instruction 8. The control of this embodiment can be regarded as the one that changes continuously the current instruction 8.

Figure 8:
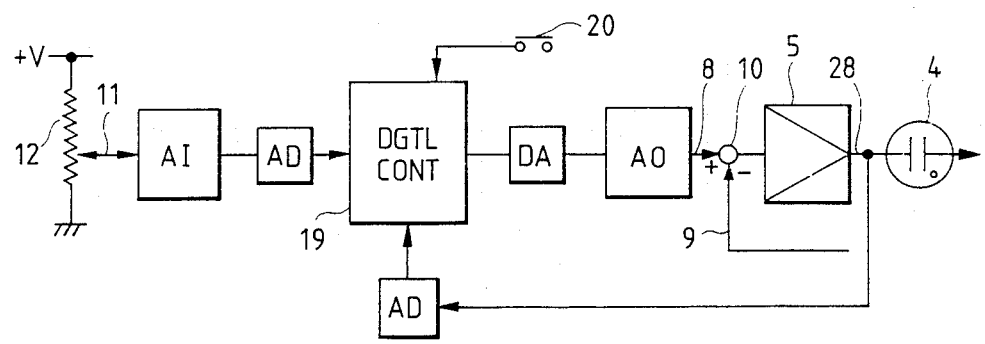
FIG. 8 is a structural view of the principal portions when control is effected in the same way as in the embodiment shown in FIG. 7 by use of a micro-computer.
Figure 9:
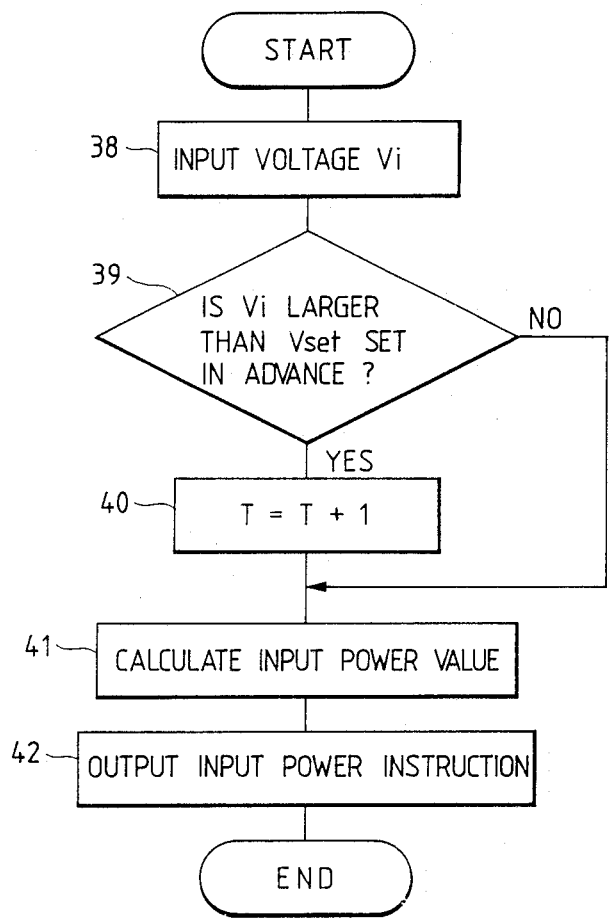
FIG. 9 is a flowchart when brightness of the screen of a projection display is controlled by use of the apparatus shown in FIG. 8.

FIG. 8 is a structural view showing the principal portions of an apparatus for making the control equivalent to that of the embodiment shown in FIG. 7 by use of a micro-computer. The processing of the digital controller 19 of this micro-computer is shown in the flowchart of FIG. 9. A voltage Vi which is a detection voltage of the voltage 28 is inputted to the digital controller 19 through AD at step 38. This Vi is compared with a Vset which is set in advance, at step 39. If Vi>Vset, brightness of the light source need not be increased and the procedure flows to step 40. When a light source use time T is reached at the pre-set voltage at step 40, the procedure then flows to step 41. A new input power value is calculated at this step 41. This calculation is based on the characteristic curve shown in FIG. 2. The input power instruction thus determined is output to the adder 10 through DA and AD at step 42. If Vi<Vset at step 39, on the other hand, the increase of the input power must be made at step 41 immediately.

Figure 10:
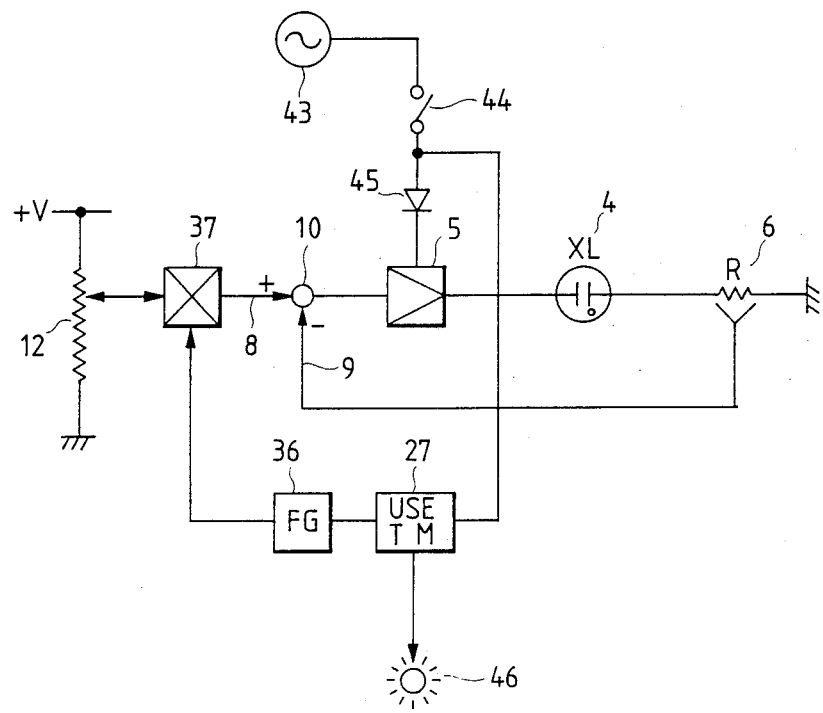
FIG. 10 is a structural view showing still another embodiment of the present invention.

FIG. 10 shows another embodiment of the present invention. This embodiment is the system which does not measure the voltage of the projection light source 4 for the measurement of the use time of the light source 4 but measures the application time of the A.C. input 43 to the D.C. amplifier 5 for the light source. In other words, a main power switch 44 and a rectifier 45 are disposed next to the A.C. input 43. This measurement method is more economical.

Furthermore, an alarm lamp 46 requiring the replacement of the projection light source 4 is disposed. If the time lapsed after the application of the maximum current to the projection light source 4 exceeds a predetermined time, the alarm lamp 4 indicates that the life of the projection light source 4 is up. Accordingly, if the light source 4 is replaced beforehand, a stable projection light source 4 free from interruption can be obtained.

Figure 11:
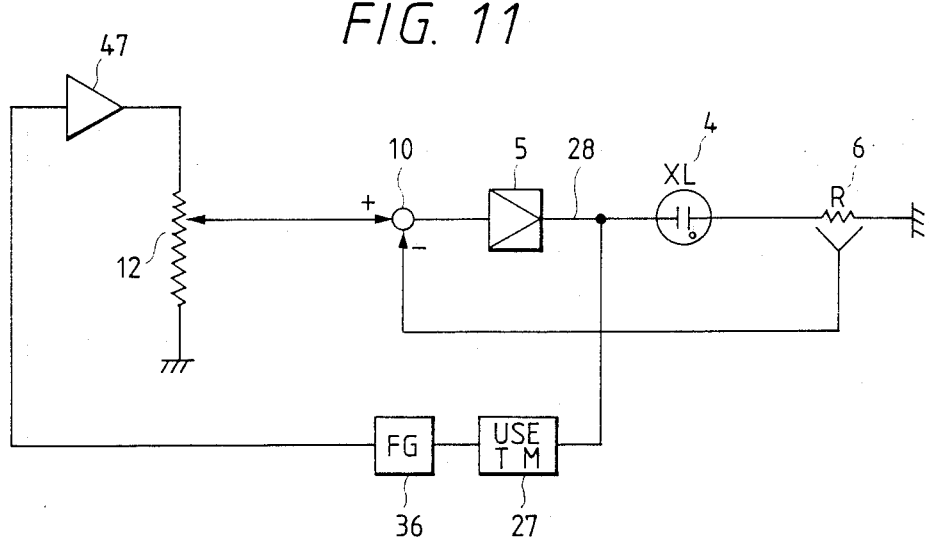
FIG. 11 is a structural view showing still another embodiment of the present invention.

In FIG. 11, there is shown disposed an amplifier 47 which changes the power source voltage for a brightness instruction resistor in accordance with the use time in place of the multiplier 37 shown in FIG. 7, and its action and effect is the same as that of FIG. 7.

In accordance with the control method of brightness of a screen of the present invention, brightness of the light source can be kept substantially constant by increasing the input power to the light source even when brightness of the light source drops with the passage of time. Accordingly, brightness of the screen, too, can be kept substantially constant and a projection display providing a stable picture in connection with brightness can be obtained. Moreover, the life of the light source can be extended.

The control method described above can be practiced easily in accordance with the control apparatus of brightness of the screen.

What we claim is:

1. A control method of brightness of a screen used for a projection display, comprising
    setting in advance a relation between the magnitude of an input power to be supplied to a light source, its supply time and brightness of said light source to a relation such that brightness becomes substantially constant;
    measuring actually the supply time of the input power to said light source; and controlling the magnitude of the input power on the basis of a relation which is set in advance by said setting so that brightness becomes substantially constant.

2. A brightness control apparatus of a screen used for a projection display, comprising:
   a light source;
   a screen on which a luminous flux emitted from said light source is modulated and displayed as an image;
   time measurement means for actually measuring the supply time of input power to said light source; and
   input power control means to which the relation between the magnitude of the input power to be supplied to said light source, its supply time and brightness of said light source is set in advance in such a manner that said brightness becomes substantially constant, which receives a signal from said time measurement means and which controls the magnitude of said input power on the basis of said relation which is set in advance so that brightness of said light source becomes substantially constant.

3. A brightness control apparatus of a screen used for a projection display according to claim 2, wherein said input power control means includes further means for changing and regulating an input current to said light source.

4. A brightness control apparatus of a screen used for a projection display according to claim 2, wherein said input power control means includes change-over switches for connecting individually the input side of said light source to a plurality of terminals having mutually different application voltages and a switch for switching said change-over switches on receiving the signal from said time measurement means.

5. A brightness control apparatus of a screen used for a projection display according to claim 2, wherein said input power control means includes a function generator which is connected to said time measurement means and to which an inverse function of the correlation between the supply time of the input power to said light source and brightness of said light source is set, and a multiplier for regulating the magnitude of the input power on receiving the signal from said function generator, disposed between said light source and its power source.

6. A brightness control apparatus of a screen used for a projection display according to claim 2, wherein said input power control means includes a function generator which is connected to said time measurement means and to which an inverse function of a correlation between the supply time of the input power to said light source and brightness of said light source is set, and an amplifier which receives a signal from said function generator and regulates a power source voltage.

7. A brightness control apparatus of a screen used for a projection display according to claim 4, wherein said time measurement means detects a voltage applied to said light source and measures its supply time.

8. A brightness control apparatus of a screen used for a projection display according to claim 5, wherein said time measurement means detects a voltage applied to said light source and measures its supply time.

9. A brightness control apparatus of a screen used for a projection display according to claim 6, wherein said time measurement means detects a voltage applied to said light source and measures its supply time.

10. A brightness control apparatus of a screen used for a projection display according to claim 4, wherein said time measurement means measures an A.C. input to a D.C. amplifier for said light source.

11. A brightness control apparatus of a screen used for a projection display according to claim 5, wherein said time measurement means measures an A.C. input to a D.C. amplifier for said light source.

12. A brightness control apparatus of a screen used for a projection display according to claim 6, wherein said time measurement means measures an A.C. input to a D.C. amplifier for said light source.

13. A brightness control apparatus of a screen used for a projection display according to claim 2, which further includes an alarm which operates after the passage of a predetermined time from the arrival of the magnitude of the input power to said light source at a set maximum value.

14. A brightness control apparatus of a screen used for a projection display according to claim 2, wherein said brightness detection means comprises a brightness detector or an illumination detector.

15. A brightness control apparatus of a screen used for a projection display according to claim 2, wherein said light source comprises either one of a Xe lamp, an Ar lamp, a mercury lamp or a halogen lamp.

16. A brightness control apparatus for a screen used for a projection display according to claim 2, which further includes means for comparing a magnitude of an input power regulated by said input power control means with the actual input power supplied to said light source and regulating the magnitude of the input power.

17. A brightness control apparatus of a screen used for a projection display, comprising:
   a light source;
   a screen on which a luminous flux emitted from said light source is modulated and displayed as an image;
   brightness detection means for detecting brightness of said screen; and
   input power control means to which the actually measured value detected by said brightness detection means is fed back, which compares the actually measured value with a set value of brightness of said screen set in advance and which controls the magnitude of the input power to be supplied to said light source in such a direction that the difference between them becomes zero, which further includes an alarm which operates after the passage of a predetermined time from the arrival of the magnitude of the input power to said light source at a set maximum value.

* * * * *